United States Patent
Pillai et al.

(10) Patent No.: US 8,399,149 B2
(45) Date of Patent: Mar. 19, 2013

(54) COMPOSITION WITH ENHANCED PROTON CONDUCTIVITY

(75) Inventors: Vijayamohanan Pillai, Gurgeon (IN); Bhalchandra A. Kakade, Gurgeon (IN); R. Kannan, Gurgeon (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 12/867,086

(22) PCT Filed: Feb. 12, 2009

(86) PCT No.: PCT/IN2009/000100
§ 371 (c)(1), (2), (4) Date: Mar. 30, 2011

(87) PCT Pub. No.: WO2009/101635
PCT Pub. Date: Aug. 20, 2009

(65) Prior Publication Data
US 2011/0171561 A1    Jul. 14, 2011

(30) Foreign Application Priority Data
Feb. 12, 2008    (IN) .................... 0371/DEL/2008

(51) Int. Cl.
*H01M 8/10* (2006.01)
*H01G 9/02* (2006.01)
(52) U.S. Cl. ........ 429/492; 429/493; 429/483; 252/62.2
(58) Field of Classification Search .................. 429/188, 429/213, 306, 492, 493, 483; 252/62.2
See application file for complete search history.

(56) References Cited

U.S. PATENT DOCUMENTS

| | | |
|---|---|---|
| 6,495,290 B1 | 12/2002 | Hinokuma |
| 2003/0077515 A1 | 4/2003 | Chen et al. |
| 2003/0157388 A1 | 8/2003 | Hinokuma |
| 2006/0291142 A1 | 12/2006 | Grigorian et al. |
| 2007/0231671 A1 | 10/2007 | Inasaki et al. |

FOREIGN PATENT DOCUMENTS

| | | |
|---|---|---|
| WO | WO2004/109837 A | 12/2004 |
| WO | WO2006/028704 A | 3/2006 |
| WO | WO2006/099392 A | 9/2006 |
| WO | WO2007/009059 A | 1/2007 |
| WO | WO2008/130365 A | 10/2008 |

OTHER PUBLICATIONS

Kang et al. "Heterogeneous hydroxylation catalyzed by multi-walled carbon nanotubes at low temperature", Applied Catalysis A: General 299 (2006) 212-217.*

Thomassin et al, "Beneficial Effect of Carbon Nanotubes on the Performances of Nafion membranes in Fuel Cell Applications," Journal of membrane Science, Elsevier Scientific Publication Company, Amsterdam, NL, vol. 303, No. 1-2, Sep. 4, 2007, pp. 252-257, XP022229356.

* cited by examiner

*Primary Examiner* — Patrick Ryan
*Assistant Examiner* — Alex Usyatinsky
(74) *Attorney, Agent, or Firm* — Edwards Wildman Palmer LLP; Barry Kramer; Nicholas J. DiCeglie, Jr.

(57) ABSTRACT

A composition showing enhanced proton conductivity comprising at least a polymer with an ionizable group (A) containing a proton and carbon nanostructures functionalized with ionizable group (B) containing a proton is disclosed where A and B are same or different.

6 Claims, 4 Drawing Sheets

COMPOSITION WITH ENHANCED PROTON CONDUCTIVITY

FIELD OF THE INVENTION

This invention relates to compositions comprising proton conducting polymers and suitably functionalized carbon nanostructures that show enhanced proton conductivity.

BACKGROUND AND PRIOR ART

Proton conductivity of the polymer electrolyte membrane (PEM) is one of the key factors limiting the performance of polymer electrolyte membrane fuel cells (PEMFCs). Significant enhancement of proton conductivity in perfluoro sulfonic acid based membranes that are commonly used today in PEMFCs is not only an urgent need, but also a highly valuable contribution to the field.

There are several attempts in the prior art to improve proton conductivity of polymer electrolyte membranes such as Zhai et al in Journal of Membrane Science 280 (2006) 148-155 has shown that proton conductivity can be increased by retaining water and Pereira et al in Chem. Mater. 2008, 20, 1710-1718 showed enhanced performance by incorporating meso porous silica in the Nafion matrix. However, there are no prior reports on the use of functionalized carbon nanostructures to enhance the proton conductivity of such membranes.

Further, there are several reports in the prior art of compositions using a polymer electrolyte and carbon nanostructures as in U.S. Pat. No. 7,361,430, which discloses a carbon nanotube (SWNT)-polymer composite actuator and method to make such actuator and WO/2006/016907 titled "Photo Actuators Based on Carbon Nanotube-Nafion Composites" discloses a photo-mechanical actuating material that is composed of an organic composite and a method of forming such a structure.

Nafion-carbon nanotube composites have been reported for fuel cell electrolyte applications by Liu et al in Electrochemical Solid-State Letters. 2006, 9, A356. These composites however showed no significant improvement in proton conductivity.

Thomassin et, al in Journal of membrane science 303, 2007, 252-257 conclude that nafion membranes modified with multi-walled carbon nanotubes with carboxyl groups significantly decreased the methanol permeability, but only slightly decreased ionic conductivity.

However, none of these prior art documents report a composition of a polymer electrolyte with suitably functionalized carbon nanostructures that can significantly enhance proton conductivity.

The objective of the invention is to have a novel composition of proton conducting polymers with carbon nanostructures which enhance proton transport. The prior art review clearly indicates that sulphonic acid membranes and carbon nanostructures, a combination of these, processes for preparing the membranes and their various applications are known. Method of functionalizing nanomaterials with various functions is disclosed in WO 2006/099392. Use of sulphonic acid membranes with carbon nanostructures in electrodes of polymer electrolyte fuel cells is known in literature. Further electron transport enhancement of said materials is also discussed in literature. However, when the inventors prepared a composition of sulphonic acid membranes with sulphonic acid functionalized carbon nanostructures, it was surprisingly found that there is at least a one log enhancement of proton transport.

Thus in this invention, we disclose novel compositions of proton conducting polymers with suitably functionalized carbon nanostructures that show a surprising enhancement in proton conductivity.

ABBREVIATION

Figure 1:
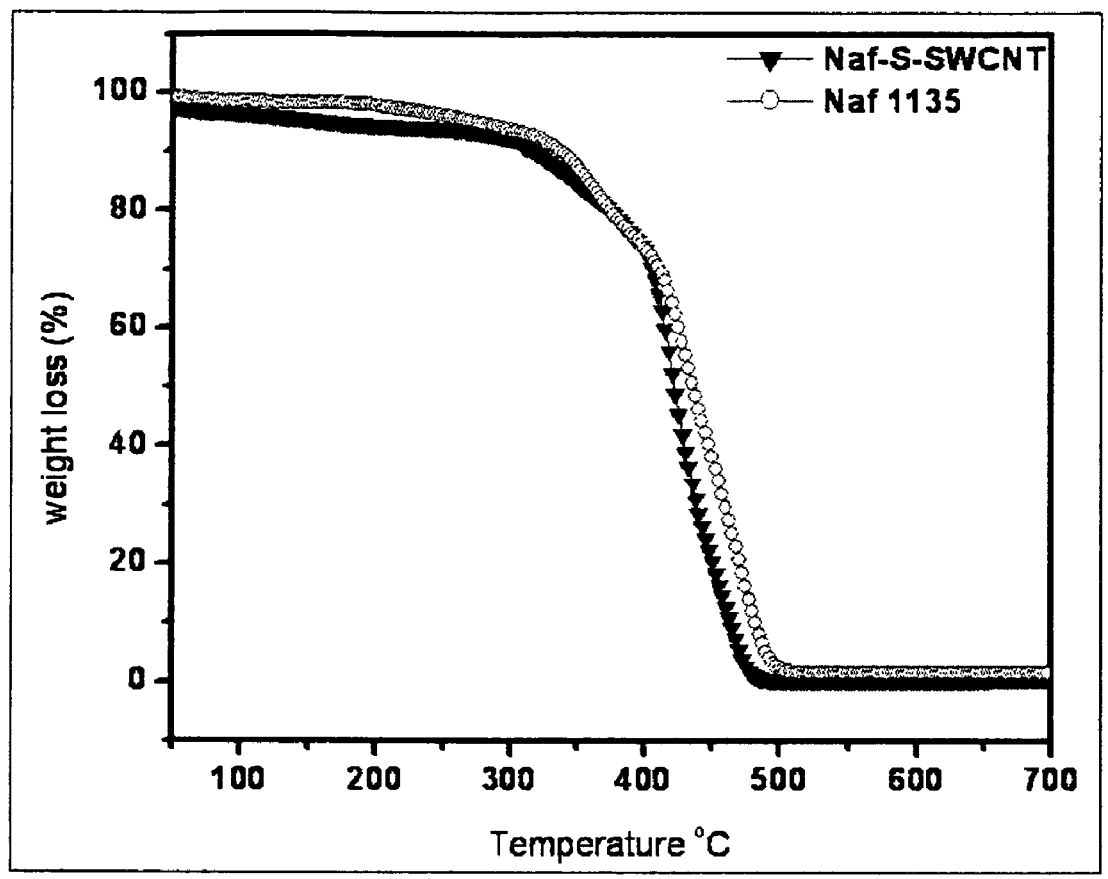
FIG. 1: Thermo gravimetric analysis of per fluoro sulfonic acid membrane (Nafion 1135) and per fluoro sulfonic acid with functionalized single walled carbon nanotube membrane in air at a rate of 10° C. min.

S-SWCNT: Functionalized single walled carbon nanotubes
MEA: Membrane electrode assembly

SUMMARY OF INVENTION

Accordingly the present invention provides a composition with enhanced proton conductivity comprising
a. a polymer with an ionizable group (A) containing a proton and
b. carbon nanostructures functionalized with ionizable group (B) containing a proton.

In an embodiment of the invention the polymer may be sulphonated polymer.

In another embodiment of the invention, the functionalzed carbon nanostructures comprise $sp^2$ carbon.

In another embodiment of the invention, the functionalized carbon nanostructures are in the form of a tube, rod or particle, alone or in combinations thereof In yet another embodiment of the invention, in the functionalized carbon nanostructure is ranging from 0.01% to 10% by weight.

In still another embodiment of the invention, the ionizable groups (A) and (B) are selected from the group consisting of sulphonate group, carboxylic group, phosphonate group and amine groups.

In a further embodiment of the invention, the ionizable group (A) and said ionizable group (B) are same.

In an embodiment of the invention, the ionizable group (A) and said ionizable group (B) are different.

In another embodiment of the invention, the polymers are selected from a group consisting of imidazole doped sulfonated poly(ether ketone)methyl benzene, sulfonated polybenzimidazoles, methyl benzensulfonated poly(p-phenyleneterephthalamide), naphthalenic polyimide, perfluorocarboxylic acid, perfluorosulfonic acid, bis(perfluoroalkylsulfonyl)imide, ortho-sulfone aminated, polysulfone, sulfonated poly(ether ether ketone), sulfonated poly(4-phenoxy benzoyl-1,4-phenylene), and sulfonated polysulfone.

In yet another embodiment of the invention, the polymer may be preferably perfluorosulphonated polymer In another embodiment of the invention, the functionalization on the carbon nanostructures is sulphonate group.

In an embodiment of the invention, the composition is used in polymer fuel electrolyte cells, hydrogen sensors and electrodes.

A composition showing enhanced proton conductivity comprising at least: a polymer with an ionizable group (A) containing a proton and carbon nanostructures functionalized with ionizable group (B) containing a proton where A and B are same or different is disclosed herein.

DETAILED DESCRIPTION OF INVENTION

In accordance with the invention, compositions of proton conducting polymers with suitably functionalized carbon nanostructures are disclosed herein. The compositions of the instant invention show enhanced proton conductivity. The composition of the invention showing enhanced proton conductivity comprises at least a polymer with an ionizable group (A) containing a proton and carbon nanostructures functionalized with ionizable group (B) containing a proton. The said polymer is sulphonated polymer, and is selected from a group consisting of imidazole doped sulfonated poly(ether ketone) methyl benzene, sulfonated polybenzimidazoles, methyl benzensulfonated poly(p-phenyleneterephthalamide), naphthalenic polyimide, perfluorocarboxylic acid, perfluorosulfonic acid, bis(perfluoroalkylsulfonyl)imide, ortho-sulfone aminated, polysulfone, sulfonated poly(ether ether ketone), sulfonated poly(4-phenoxy benzoyl-1,4-phenylene), and sulfonated polysulfone, preferably perfluoro sulphonated polymer. The ionic group (A) in the polymer is selected from the group comprising sulphonate group, carboxylic group, phosphanate group, amine group and such like. The ionic groups A and B are optionally same or different. The groups A and B are preferably sulphonate group. The functionalized carbon nanostructures of the invention comprise $sp^2$ carbon.

According to the instant invention, the composition is prepared by mixing the solution of functionalized carbon nanostructured material comprising of $sp^2$ carbon and sulphonated polymer. The carbon nanostructured material is in the form of a tube, rod or particle, alone or in combinations thereof.

In an embodiment of the invention, the sulfonic acid functionalized carbon nanostructured material, and perfluoro sulfonic acid are mixed and stirred in a solvent. The said solvent is selected from N,N-dimethyl acetamide, N,N-dimethyl formamide, water and lower aliphatic alcohols. In the functionalized single walled carbon nano structures with sulphonated polymer, the functionalized carbon nanostructure is ranging from 0.01% to 10%.

The compositions are prepared by processes known in literature.

Figure 2:
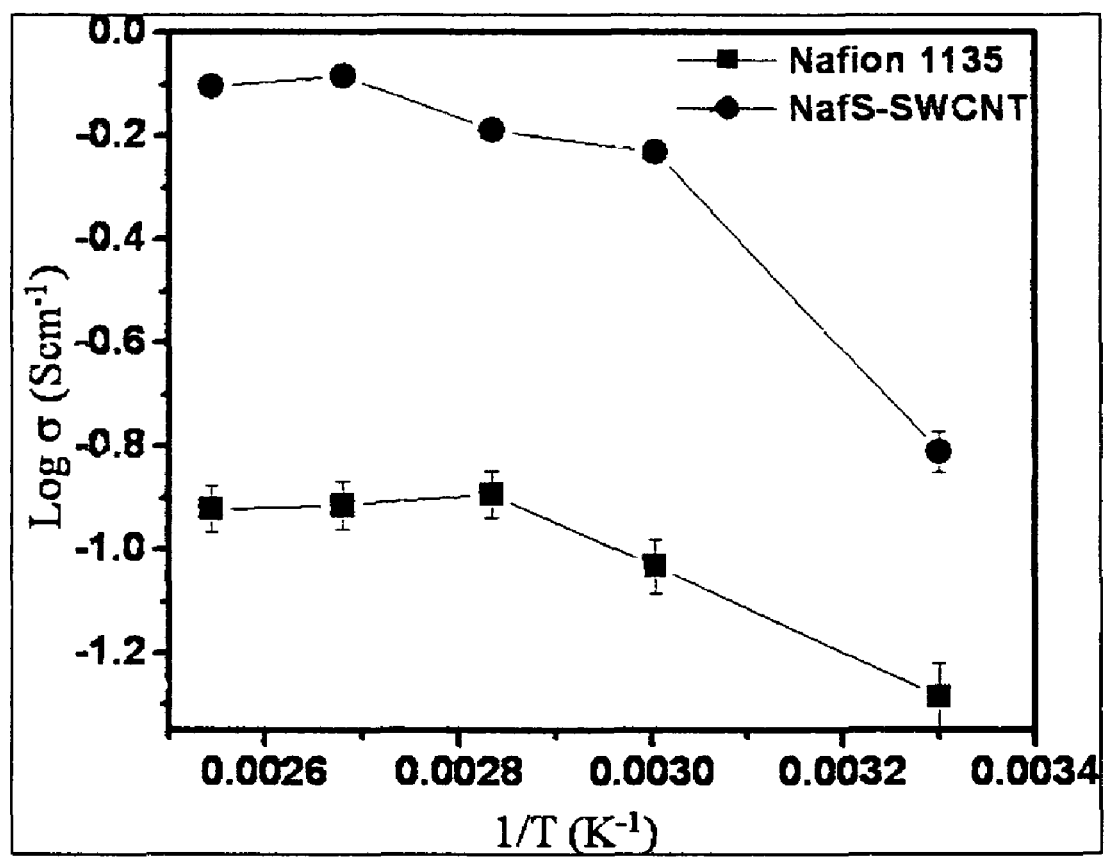
FIG. 2: Temperature dependent proton conductivity of per fluoro sulfonic acid membrane (Nafion 1135) and per fluoro sulfonic acid with functionalized single walled carbon nanotube membrane at 100% relative humidity by a home made two probe impedance set up in the range between 1 MHz to 0.1 Hz. An order of magnitude increase in proton conductivity is seen from this figure for the composite membrane of the invention over per fluoro sulfonic acid membrane (Nation 1135 membrane).
Figure 3:
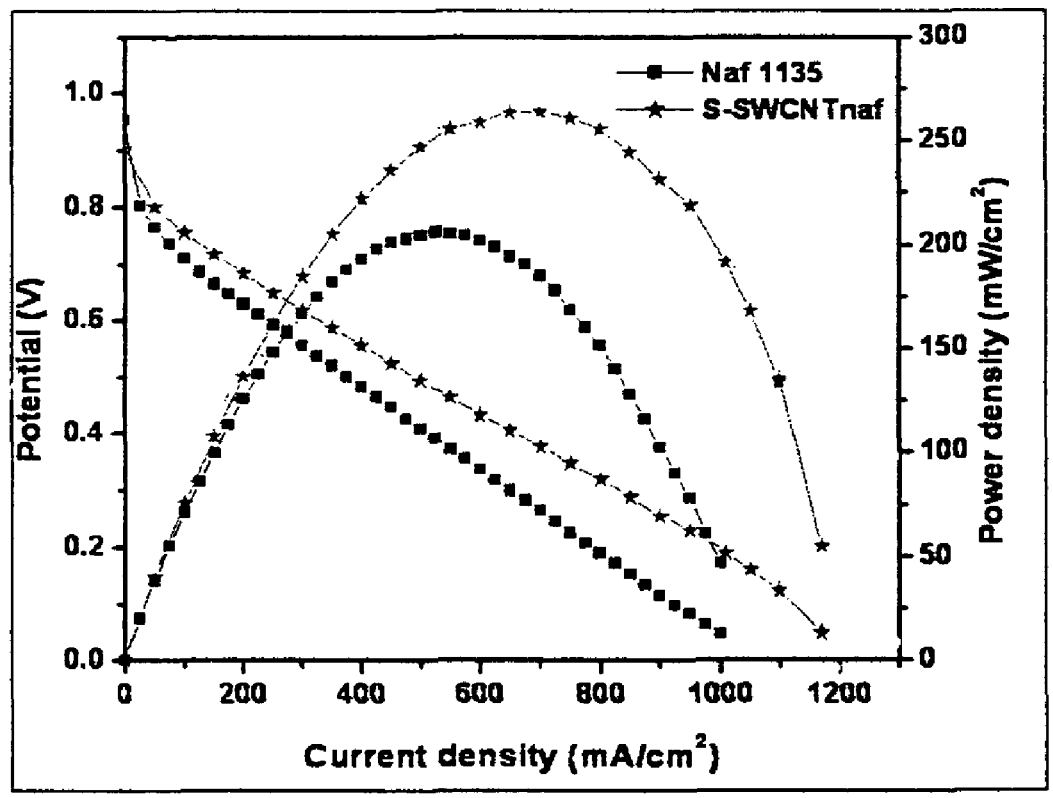
FIG. 3: Polarization curves obtained with per fluoro sulfonic acid with functionalized single walled carbon nanotube membrane and per fluoro sulfonic acid membranes (Nation 1135) at 60° C. with humidified $H_2$ and $O_2$. The flow rate was 0.4 slpm. The cells were conditioned for 30 minutes at open circuit potential and at 0.2 V for 15 minutes before measurements. The enhanced performance of the composite membrane comprising the composition of the invention is shown herein. The activation loss and ohmic loss are less for the cell using composite membrane of the invention in comparison to that using per fluoro sulfonic acid membrane (Nafion 1135).
Figure 4:
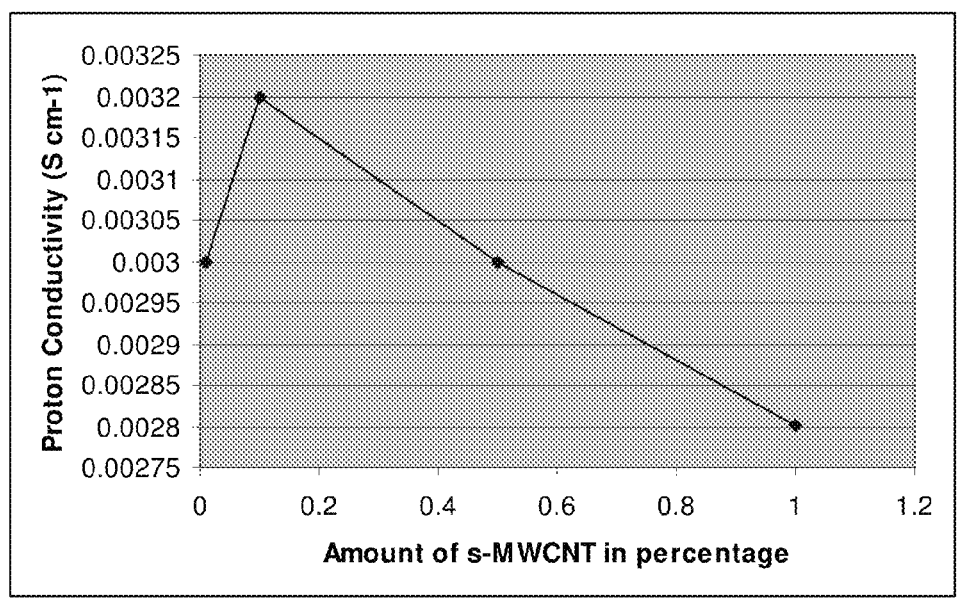
FIG. 4: Conductivity of the composite membranes with varying compositions of sulfonic acid functionalized carbon nanostructured materials with per fluoro sulfonic acid at 60° C.

The compositions of the invention are exemplified as membranes to study enhancement in proton transport. The conductivity of the compositions of the invention are studied and found to be enhanced in comparison to the membranes with nonfunctionalized carbon nanotubes by one log as seen in FIG. 2 and exemplified herein. Further, FIG. 4 shows the proton conductivity of the membrane comprising the composition of the invention with varying compositions of sulfonic acid functionalized carbon nanostructured materials.

The compositions of the invention help to achieve improved power density values and aid in reducing the cost of fuel/kW in fuel cell applications. The carbon nanotubes in the composition improve the electrode-electrolyte interface and increase the mechanical stability of the membrane.

The compositions of the invention can be used in polymer fuel electrolyte cells, water electrolyzers, hydrogen sensors, and similar devices where enhanced proton transport across the membrane could be beneficial in terms of better efficiency and improved performance.

The following examples are presented in order to further illustrate the invention. These examples should not be construed in any manner to limit the invention.

The compositions of the invention are exemplified as membranes to study enhancement in proton transport

EXAMPLES

Example 1

10 mg of carbon material was added to 20 mL of a 1:1 mixture of 70% nitric acid and 97% sulfuric acid aqueous solutions in the reaction chamber. The microwave power was set at 70% of a total of 600 W. The reaction vessel was then subjected to microwave radiation for 5 min. Thus prepared sulfonic acid functionalized carbon material was filtered and dried in a vacuum oven for 10 h at 70° C. This carbon material was dissolved in dimethyl acetamide and mixed with a solution of Nafion in N,N-dimethyl acetamide in appropriate amount at 60° C. and stirred for four hours before casting it as thin uniform membrane. Before using for fuel cell-MEA fabrication, this membrane was treated with $H_2O_2$ and $H_2SO_4$ to obtain in the protonated form. The gas diffusion layers for electrodes were prepared by brushing the slurry of Vulcan XC-72 carbon, PTFE in cyclohexane on Teflon treated carbon cloths followed by annealing at 350° C. for half an hour. The catalyst layer was prepared by brushing 20% Pt/C, Nafion and isopropyl alcohol mixture on the gas diffusion layers. On top of this catalyst layer a thin coating of nafion was given and then the electrodes were dried by a hot air blower. These electrodes were pressed uni-axially with the composite membrane at a compaction pressure of 1 ton and temperature of 120° C. Thus prepared MEAs were tested for fuel cell polarization studies using Hydrogen and Oxygen as fuel and oxidant respectively by connecting to a load. The membrane prepared with 0.05% of functionalized single walled carbon nano structures with sulphonated polymer was prepared by the method described above and tested. It showed a one log enhancement in proton conductivity in comparison to Nafion alone as seen in FIGS. 2 and 4.

Example 2

Carbon material (~0.50 g) was oxidized with 50 ml of nitric acid (1 molar) at 333 K for 3 h, and then rinsed and dried at 393 K for 12 h to obtain acidified carbon nanotube. This carbon material was mixed with 97% sulfuric acid and was stirred for 18 h at 523 K under a flow of $N_2$. After cooling down to room temperature, the product was washed repeatedly with distilled water and dried in an oven at 393 K for 12 h to obtain sulfonated carbon nanotubes. Thus prepared sulfonic acid functionalized carbon material was filtered and dried in a vacuum oven for 10 hours at 70° C. This carbon material was dissolved in N,N-dimethyl acetamide and mixed with a solution of Nafion in dimethyl acetamide in appropriate amount at 60° C. and stirred for four hours before casting it as thin uniform membrane electrolytes and testing as illustrated in example I. The membrane prepared with 0.01% of functionalized single walled carbon nano structures with sulphonated polymer was prepared by the method described above and tested. It showed a proton conductivity of 0.003 S/cm as seen in FIG. 4.

Example 3

500 mg of carbon material was dissolved in 250 ml of dehydrated toluene, and 200 mg of iodine and 2.5 g of NaI were added. While stirring up, excessive quantity of methane disulfonic acid chloride (1.6 g) was added. Under argon gas atmosphere, this was stirred up at room temperature from 24 to 96 h. Then unreacted impurities were rinsed with a large quantity of toluene, diethyl ether and hexane, a precursor of sulfonic acid type carbon derivative was obtained. This precursor was stirred up in 100 ml of 1M NaOH solution at room temperature for one hour to 30 h for hydrolysis. The solution thus obtained was subjected to proton ion exchange, and the sulfonic acid carbon nanotube derivative was obtained. This carbon material was dissolved in dimethyl acetamide and mixed with a solution of Nafion in dimethyl acetamide in appropriate amount at 60° C. and stirred for four hours before casting it as thin uniform membrane. The membranes prepared with 0.1% and 0.5% of functionalized single walled carbon nano structures with sulphonated polymer were prepared by the method described above and tested. They showed a proton conductivity of 0.0032 S/cm and 0.003 respectively as seen in FIG. 4.

Example 4

500 mg of carbon material was dissolved in 250 ml of dehydrated toluene, and 200 mg of iodine and 2.5 g of NaI were added. While stirring up, excessive quantity of methane disulfonic acid diethyl ester (1.85 g) was added. Under argon gas atmosphere, this was stirred up at room temperature from 24 to 96 hours. Then unreacted impurities were rinsed with a large quantity of toluene, diethyl ether and hexane, a precursor of sulfonic acid type carbon derivative was obtained. This precursor was stirred up in 100 ml of 1M NaOH solution at room temperature for one hour to 30 h for hydrolysis. The solution thus obtained was subjected to proton ion exchange, and the sulfonic acid carbon nanotube derivative was obtained. This carbon material was dissolved in dimethyl acetamide and mixed with a solution of Nafion in dimethyl acetamide in appropriate amount at 60° C. and stirred for four hours before casting it as a thin uniform membrane. Before using for fuel cell MEA fabrication, this membrane was treated with $H_2O_2$ and $H_2SO_4$ to obtain the membrane in the protonated form. The gas diffusion layers for electrodes were prepared by brushing the slurry of Vulcan XC-72 carbon, PTFE in cyclohexane on Teflon treated carbon cloths followed by annealing at 350° C. for half an hour. The catalyst layer was prepared by brushing 20% Pt/C, Nafion and isopropyl alcohol mixture on the gas diffusion layers. On top of this catalyst layer a thin coating of nafion is given and then the electrodes were dried by a hot air blower. These electrodes were pressed uni-axially with the composite membrane at a compaction pressure of 1 ton and temperature of 120° C. Thus prepared MEAs were tested for fuel cell polarization studies. The membrane prepared with 1% of functionalized single walled carbon nano structures with sulphonated polymer was prepared by the method described above and tested. It showed a proton conductivity of 0.0028 S/cm as seen in FIG. 4.

Example 5

Measurement of Proton Conductivity Through Impedance Technique

The membrane sample was placed in between the two stainless steel plates of a home-made two probe cell with in-built heaters. The humidity inside the chamber was saturated (100% RH) and experiments were carried out in the frequency range of 1 MHz to 0.1 Hz. The high frequency intercept on the X-axis gave the information about the resistivity of the membrane sample. The measurements were carried out in the temperature range of 25° C. (room temp) to 120° C. The membrane of the invention showed a one log enhancement in proton transport as seen in FIG. 2.

We claim:
1. A composition with enhanced proton conductivity comprising
 a) a sulphonic acid functionalized polymer, and
 b) sulphonic acid functionalized carbon nanostructures,
wherein the functionalized carbon nanostructure ranges from 0.01% to 1.0% by weight, and wherein the proton conductivity of the composition ranges from 0.0028 S/cm to 0.0032 S/cm.
2. The composition as claimed in claim 1, wherein the functionalized carbon nanostructures comprise $sp^2$ carbon.
3. The composition as claimed in claim 1, wherein the functionalized carbon nanostructures are in the form of a tube, rod or particle, alone or in combinations thereof.
4. The composition as claimed in claim 1, wherein the polymers are selected from a group consisting of imidazole doped sulfonated poly(ether ketone)methyl benzene, sulfonated polybenzimidazoles, methyl benzensulfonated poly(p-phenyleneterephthalamide), perfluorosulfonic acid, 'bis (perfluoroalkylsulfonyflimide, ortho-sulfone aminated, polysulfone, sulfonated poly(ether ether ketone), sulfonated poly(4-phenoxy benzoyl-1,4-phenylene), and sulfonated polysulfone.
5. The composition as claimed in claim 1, wherein the polymer is preferably perfluorosulphonated polymer.
6. The composition as claimed in claim 1, wherein said composition is used in polymer fuel electrolyte cells, hydrogen sensors or electrolyzers.

* * * * *